United States Patent [19]

Kon

[11] Patent Number: 4,663,211

[45] Date of Patent: May 5, 1987

[54] TRIM COVER ASSEMBLY FOR A VEHICLE SEAT

[75] Inventor: Shigeki Kon, Akishima, Japan

[73] Assignee: Tachikawa Spring Co., Ltd., Tokyo, Japan

[21] Appl. No.: 773,885

[22] Filed: Sep. 9, 1985

[30] Foreign Application Priority Data

Sep. 29, 1984 [JP] Japan ............................... 59-206078
Sep. 30, 1984 [JP] Japan ............................... 59-148893

[51] Int. Cl.$^4$ .............................................. B32B 3/30
[52] U.S. Cl. .................................... 428/167; 297/452; 297/DIG. 1
[58] Field of Search .............. 297/452, DIG. 1; 428/167

[56] References Cited

U.S. PATENT DOCUMENTS

| | | | |
|---|---|---|---|
| 3,632,164 | 1/1972 | Radke | 297/219 |
| 3,663,057 | 5/1972 | Lohr et al. | 297/388 |
| 3,951,455 | 4/1976 | Bandel et al. | 297/452 |
| 3,961,001 | 6/1976 | Bethe | 264/46.4 |
| 4,057,292 | 11/1977 | Arnold | 297/452 |
| 4,197,342 | 4/1980 | Bethe | 428/159 |
| 4,379,352 | 4/1983 | Hauslein et al. | 5/471 |

FOREIGN PATENT DOCUMENTS 2358992 5/1975 Fed. Rep. of Germany .

Primary Examiner—John E. Kittle
Assistant Examiner—Patrick J. Ryan
Attorney, Agent, or Firm—Cushman, Darby & Cushman

[57] ABSTRACT

A trim cover assembly forming the surface of a vehicle seat such as an automotive seat is disclosed which comprises a three-layer lamination composed of a thermally weldable covering material, a wadding formed of a thermally weldable foam material and a wadding cover. In the trim cover assembly, the three-layer lamination is pressurized and heated by a high frequency welding machine to form a plurality of recessed grooves in one or more main bodies of the trim cover assembly and at the same time to provide a plurality of joint portions, which are formed by collapsing the above-mentioned three elements of the trim cover assembly, along the ends of the trim cover assembly lying in the extensions of the recessed grooves, so that the intersections of the recessed grooves and joint portions are regularly folded to facilitate the positive and fine welding of other components of the trim cover assembly to the joint portions.

4 Claims, 21 Drawing Figures

PRIOR ART

TRIM COVER ASSEMBLY FOR A VEHICLE SEAT

BACKGROUND OF THE INVENTION

1. Field of the Invention

The present invention relates to an improved trim cover assembly forming the surface of a seat for use in a vehicle such as an automobile and, more particularly, to the improvements relating to the main body and the side cover to be connected thereto of a trim cover assembly which comprises a covering material, a foam wadding and a wadding cover and also which is provided on the surface thereof with a plurality of decorative recessed grooves formed by a welder so as to extend from one of edges of the trim cover assembly to the other.

2. Description of the Prior Art

A conventional trim cover assembly is formed by a main body together with a side cover or a gore sewn to the peripheries of the main body. In the prior art, as shown in FIG. 20, a plurality of decorative recessed grooves (A')(A') ---are formed in the main body by a high-frequncy welding machine so as to extend from one edge of the main body to the other edge and thereafter, as shown in FIG. 21, the main body is sewn by a sewing machine along the two edges thereof to form a joint portion (B') for connection with the side cover or the like. In the prior art forming operation, the trim cover assembly is formed by sewing the joint portion (B') while cutting the main body along the outer configuration thereof in a direction of arrows in FIG. 21. As illustrated in the drawings, however, since a covering material (10) is foldedly sewn in the portions thereof where the above-mentioned recessed grooves are formed, the edges of the recessed grooves are resultantly deformed, which impairs the aesthetic apperance of the trim cove assembly. In addition, since the thus-formed joint portion (B') varies in quality, it is difficult to sew the side cover or the like thereto, which is a disadvantage in the prior art trim cover assembly. By the way, the gore or side cover is connected integrally to the above-mentioned joint portion (B') by a sewing machine and a high-frequency welding machine.

In FIG. 20, reference numeral (11) designates a wadding which is formed of a foam material and (12) represents a wadding cover. The above-mentioned covering material (10), wadding (11) and wadding cover (12) are joined integrally with one another by a high-frequency welding machine or the like in the respective portions thereof where the recessed grooves are formed.

Also, in the prior art, there has been enforced a method in which the main body and the side cover of a trim cover assembly to be produced are first cut in their predetermined configurations respectively and then are integrally joined with each other by a high-frequency welding machine so as to form the trim cover assembly. This prior art forming method, indeed, is advantageous in that it is capable of joining or connecting the main body and side cover with each other simply and positively. But, in a trim cover assembly of a type that the ends of the side cover thereof must be connected with ends of the main body thereof perpendicularly to the decorative recessded grooves in the main body, the decorative recessed grooves must be previously formed in the main body before the side cover can be integrally joined with the main body. In other words, according to the above-mentioned prior art method, the ends of both of the side cover and main body must be faced in the same direction and superposed on each other to prevent the welded portions of the side cover and main body, that is, the joint portions thereof from being exposed externally. This means in a sense that electrodes used for forming the recessed groove in the main body provide obatacles to the side cover. For this reason, in the prior art method, the connection of the ends of both of the main body and side cover cannot performed in a direction perpendicular to the recessed grooves simultaneously with the formation of the recessed grooves in the main body.

In a trim cover assembly of a type that the ends of the main body and side cover thereof are to be connected to each other in parallel with the recessed grooves in the main body, however, the above-mentioned disadvantage is not found in the prior art forming method because the electrodes used for forming the decorative recessed grooves provide no obstacles to the side cover.

SUMMARY OF THE INVENTION

The present invention aims at eliminating the drawbacks found in the above-mentioned prior art trim cover assembly.

Accordingly, it is an object of the invention to provide an improved trim cover assembly which prevents deformed ends of a plurality of decorative recessed groove formed in the main body thereof and also in which a joint portion of the main body formed in a direction of the extension of the above-mentioned recessed grooves is adapted such that a side cover or gore can be accurately joined therewith.

In achieving the above object, according to the invention, there are provided a plurality of decorative recessed grooves in the main body of the trim cover assembly of the invention respectively so formed as to extend from one edge of the main body to the other on the covering material side of the present trim cover assembly. Also, there are provided joint portions which are formed by pressurizing and heating three components of the present trim cover assembly, that is, a covering material, a foam wadding and a wadding cover into an integral one along the above-mentioned two edges, simultaneously with the formation of the above-mentioned recessed grooves for decoration. In other words, by forming the joint portions simultaneously with the formation of the decorative recessed grooves, the ends of the decorative recessed grooves can be formed without deforming the shapes thereof. Also, as mentioned above, since the joint portions are formed by pressurizing and heating the covering material, foam wadding and wadding cover into an integral one, they are stable or uniform in quality when compared with the above-mentioned prior art, which permits accurate mounting of the side cover and the gore to the joint portions.

It is another object of the invention to provide an improved trim cover assembly in which, simultaneously with the formation of the decorative recessed grooves in the main body, the ends of both of the main body and the side cover can be joined to each other in a direction perpendicular to the decorative recessed grooves.

To attain this object, according to the invention, a joint forming electrode, which is disposed perpendicularly to electrodes for forming the recessed grooves so as to connect or join the ends of the main body and the side cover with each other, is positioned adjacent to the groove forming electrodes with a space therefrom corresponding to the thickness of the side cover, and also is removably mounted. Thus, since the side cover can be inserted into the space formed between the recessed-groove forming electrodes and the joint forming electrode and also the two ends of the side cover can be superposed on each other while they are faced in the same direction, the ends of the main body and the side cover can be integrally connected with each other by the joint electrode simultaneously with the formation of the decorative recessed grooves in the main body.

The above and other related objects and features of the invention will be more apparent from a reading of the following description of the disclosure found in the accompanying drawings and the novelty thereof pointed out in the appended claims.

DETAILED DESCRIPTION OF PREFERRED EMBODIMENTS OF THE INVENTION

Referring now to FIGS. 1–7, there is illustrated a first embodiment of the invention.

Figure 1:
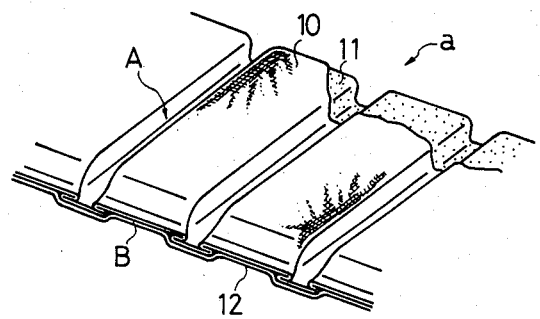
FIG. 1 is a partially cutaway perspective view of a first embodiment of the invention.

In FIG. 1, there is illustrated a main body (a) of a trim cover assembly constructed in accordance with the present invention, the main body (a) being cut away in part for illustration. In the drawings, reference characters (A)(A)—designate recessed grooves for decoration, respectively, and (B) represents a joint portion provided in the edge of the main body (a). In the ends of the recessed grooves (A)(A)—a covering material (10) located therein is folded in an S-shaped configuration to form a part of the joint portion (B).

Figure 2:
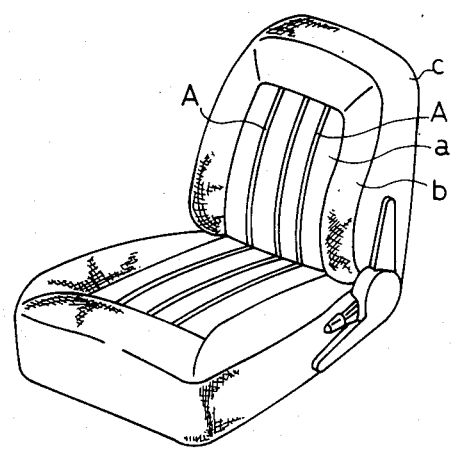
FIG. 2 is a perspective view of the first embodiment, illustrating a state in which it is used in a vehicle seat.

In FIG. 2, there is illustrated a state wherein a trim cover assembly employing the main body (a) of the invention is being used in a seat. A side cover (b) composed of a single covering material is integrally attached to the main body (a) by suitable means such as by sewing or adhesion to form the trim cover assembly. In this FIG., reference character (c) designates a gore sewn to the side cover (b) via a welt. Longitudinally of the main body (a), there are formed a plurality of recessed grooves for decoration which extend parallel to one another.

Figure 3:
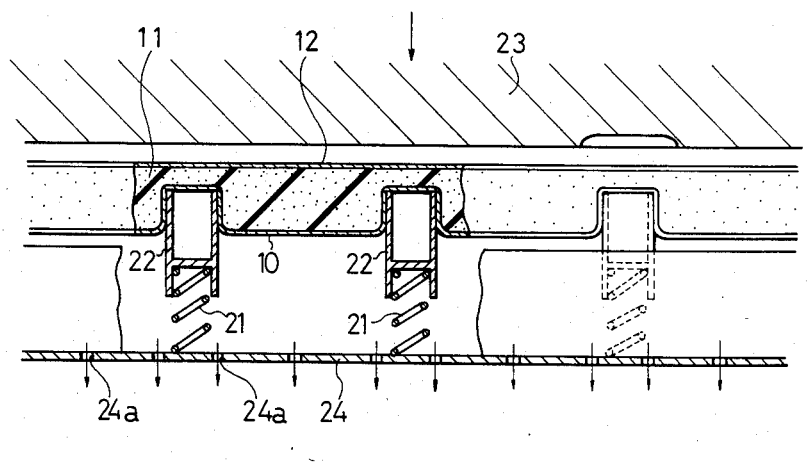
FIGS. 3–5 respectively are sectional views, cut away (in part, of the first embodiment, illustrating a method of forming the first embodiment.
Figure 4:
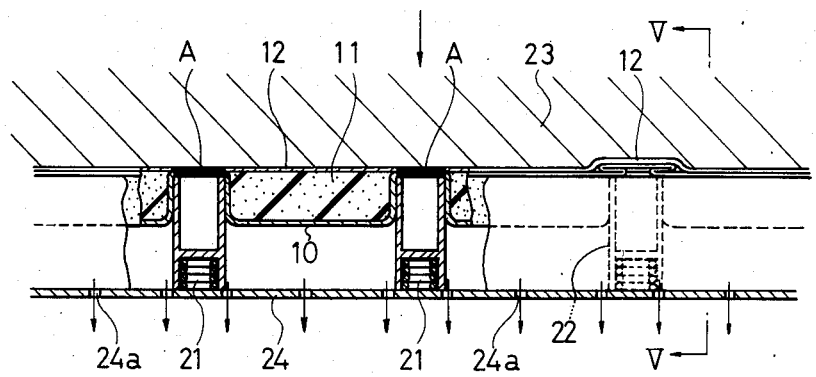

FIGS. 3–6 illustrate how to form the trim cover assembly of the invention. In FIG. 3, there is shown a state in which the decorative recessed grooves (A) are formed. Specifically, the covering material (10) is first placed over a plurality of electrodes (22)(22)(22)—in such a manner that it is folded in part so as to follow the outside shapes of the upper portions of the electrodes (22). These electrodes (22) are resiliently biased upwardly by compression springs (21) for forming the above-mentioned recessed grooves. After then, a wadding (11) formed of a foam material (a urethane-foam slab material) and a wadding cover are placed onto the covering material (11) sequentially. The wadding (11) may be formed in a flat plate, or, as shown in the drawings, may be formed with recessed-groove-shaped portions into which the electrodes (22)(22)(22) are to be inserted. Thereafter, an electrode (23) is pressed in a direction of an arrow shown in FIG. 4. Accordingly, when the electrodes (22)—are brought into contact with a fixed plate (24), they are energized and high frequency waves are given thereto. As a result of this, the portions of the wadding (11) between the respective electrodes (22)(22)—and the electrode (23) are collapsed and thus welded integrally to the associated portions of the covering material (10) and the wadding cover (12) so as to form the above-mentioned trim cover assembly (A)—(FIG. 4).

Figure 5:
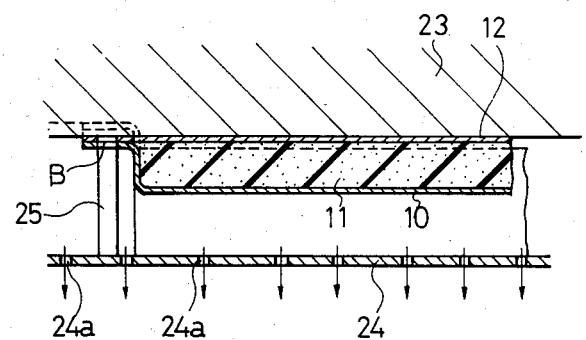

In this forming process, since, in such a position as corresponds to the end of the lamination composed of the covering material (10), wadding (11) and wadding cover (12), there is provided an electrode (25) standing up from the fixed palte (24) for forming the above-mentioned joint portion (B), the covering material (10) of a U-shaped section is folded in an S-shaped configuration and welded simultaneously when the above-mentioned decorative recessed grooves (A) are formed by welding (FIG. 5).

Figure 6:
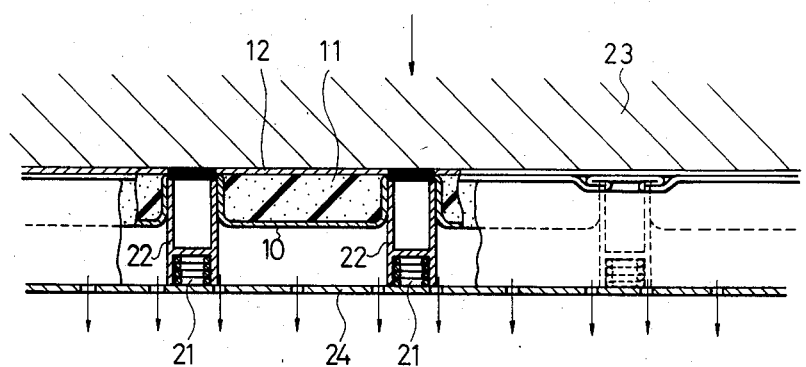
FIGS. 6 and 7 are respectively sectional views, cut away in part, of the first embodiment, illustrating another method of forming the first embodiment.

Referring now to FIG. 6, the surface of the electrode (25) facing the electrode (23) is formed flat so that the portions of the above-mentioned decorative recessed grooves (A) to be folded by the two electrodes (25) and (23) can be located internally.

Figure 7:
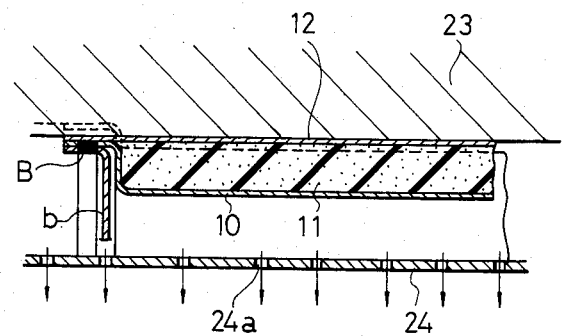

Referring now to FIG. 7, there is illustrated a partially cutaway sectional view of the first embodiment. With the ends of the side cover (b) being placed on the above-mentioned electrode (25), the side cover (b) is weldedly connected to the above-mentioned main body (a) by a high frequency wave simultaneously with the formation of the joint portion (B) of the main body (a).

The above-mentioned main body (a) forms the trim cover assembly when the side cover (b) or the gore (c) is attached to the joint portion (B) of the main body (a) by high-frequency welding or by sewing.

As described above, according to the invention, since the joint portion provided along the edges of the main body is formed simultaneously when the decorative recessed grooves are formed, a much better operationability is obtained when compared with the above-mentioned prior art trim cover assembly in which, after formation of the decorative recessed grooves, the ends thereof are sewn. Also, due to the simultaneous formation of the joint portion, there is eliminated the possibility that the ends of the decorative recessed grooves may deformed during sewing as in the prior art trim cover assembly. Further, since the joint portion is pressurized and heated to be collapsed into a flat-plate configuration, the side cover or the gore can be attached to the joint portion accurately and uniformly.

Referring now to FIGS. 8-19, there is illustrated a trim cover assembly which is produced by a manufacturing apparatus of the present invention.

This trim cover assembly comprises a main body (a), side covers (b1)(b2) and a gore (c) (not shown), while the main body (a) is provided with a plurality of decorative recessed grooves (A)(A)—which are formed by a welder. These recessed grooves (A)(A) are produced by heating and collapsing a three-layer lamination of a covering material (1O), a foam wadding (11) and a wadding cover (12) by a high-frequency welding machine so that recessed grooves can be formed on the surface of the three-layer lamination. And, the ends of the main body (a), together with the ends of the side cover (b), are integrally welded by a manufacturing apparatus to be described below in detail.

Figure 8:
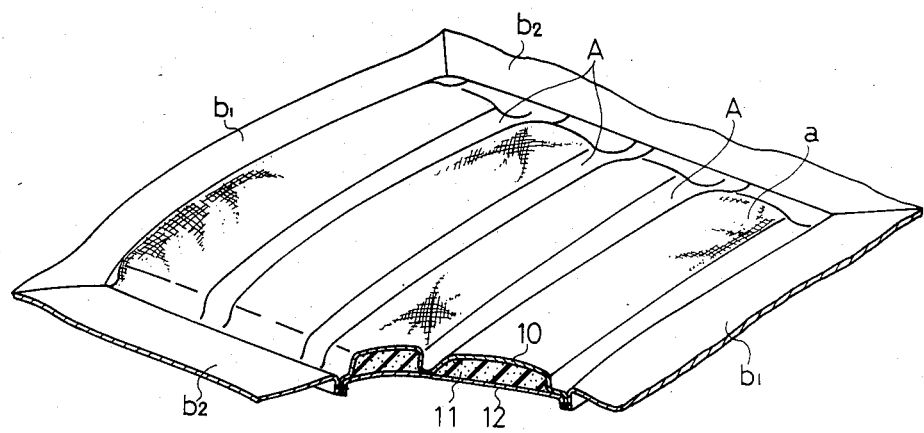
FIG. 8 is a partially cutaway perspective view of a embodiment of the invention.

As shown in FIG. 8, the first ends (b1) of the side cover (b) are welded in parallel with the recessed grooves (A) in the main body (a), while the second ends (b2) of the side cover are welded perpendicularly to the recessed grooves (A). The welded portions of both of them are located on the back surface of the main body so as not to be exposed externally.

Figure 9:
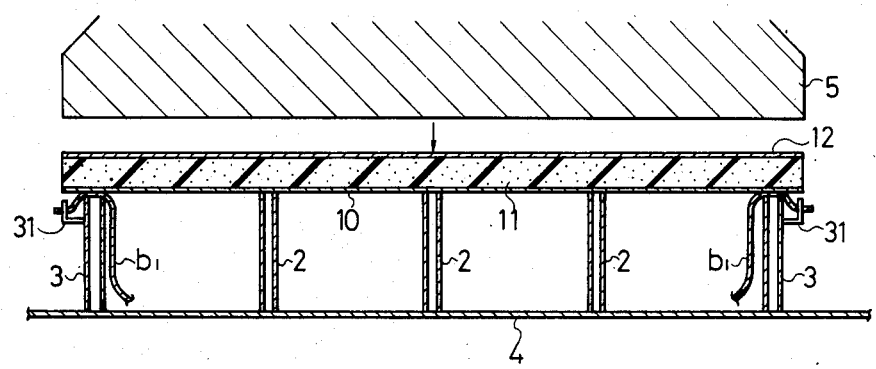
FIG. 9 is a sectional view of the second embodiment, illustrating a state in which the second embodiment is set in an apparatus for welding the side cover thereof to the main body thereof in parallel with the recessed grooves in the main body.
Figure 10:
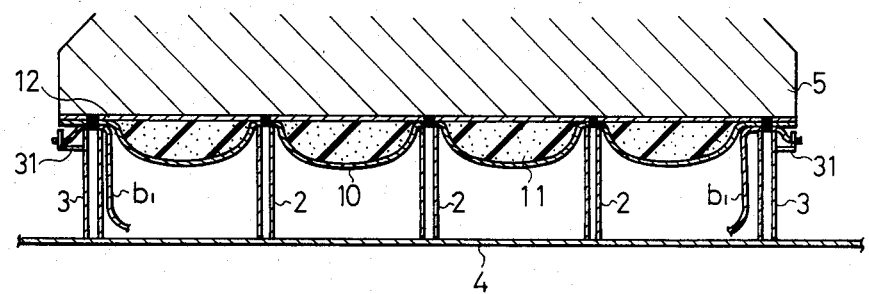
FIG. 10 is a sectional view of the second embodiment, illustrating a state in which the side cover of the second embodiment has been welded.
Figure 11:
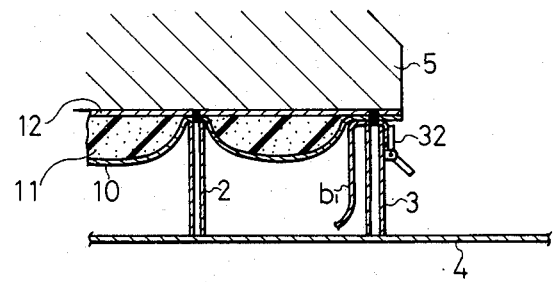
FIG. 11 is a partially longitudinal section view of the second embodiment, illustrating means to fix the ends of the side cover by means of a gripping piece.

In FIGS. 9 to 11, there is illustrated an apparatus for welding the ends of the side cover (b) to the ends of the main body (a) by high-frequency waves in parallel with the recessed grooves (A) of the main body (a). In these FIGS., reference numerals (2)—(3)(3) designate lower electrodes, and (5) represents an upper electrode. The lower electrodes (2)—(3)(3) include electrodes (2)(2)(2) for forming the recessed grooves (A) and electrodes (3)(3) standing up in parallel with such electrodes (2)—for joining the side cover (b). These electrodes (2)(3) are disposed on an electrode (4).

In welding, the three-layer lamination composed of the covering material (10), foam wadding (11) and wadding cover (12) which form the main body (a) is placed onto the above-mentioned lower electrodes (2)(3). Then, in front of the three-layer lamination and the lower electrodes, the side cover (b) is mounted with the ends (b1)(b1) thereof being oriented in the same direction as with the ends of the above-mentioned covering material (10). To make sure this mounting, there are formed through bores respectively extending along the front edges of the ends (b1)(b1) of the side cover (b), and hook-shaped projection pieces (31)(31) provided in the lower electrodes (3) are inserted into and secured to the through bores.

In FIG. 10, there is illustrated a state in which the above-mentioned upper electrode (5) is lowered down to apply high freqency waves so as to form the recessed grooves (A) in the main body (a) and at the same time to weld the ends of the main body (a) integrally to the ends (b1)(b1) of the side cover (b).

In FIG. 11, there is illustrated another means for fixing wherein, instead of the above-mentioned hook-shaped projection pieces (31), gripping pieces (32) are provided in the lower electrodes (3) so as to grip and fix the front portions of the ends (b1) of the side cover (b).

In FIGS. 12 to 15, there are illustrated two kinds of apparatus each of which is capable of welding integrally the ends of the side covers (b2)(b2) in a direction perpendicular to the recessed grooves simultaneously with the formation of the recessed grooves. In the illustrated apparatus, two joint electrodes (6)(6) for welding the ends of both of the side covers (b2)(b2) and the main body (a) integrally are respectively mounted movably, adjacently to the two ends of the recessed-groove forming lower electrode (2). That is, the joint electrodes (6)(6) are mounted in such a manner that the upper portions thereof are capable of approaching toward the respective side end surfaces of the recessed-groove forming lower electrode (2) up to such positions as spaced apart from the side end surfaces of the lower electrode (2) a distance corresponding to the thickness of the material of the side covers (b2)(b2), by means of cylinders or the like.

Figure 12:
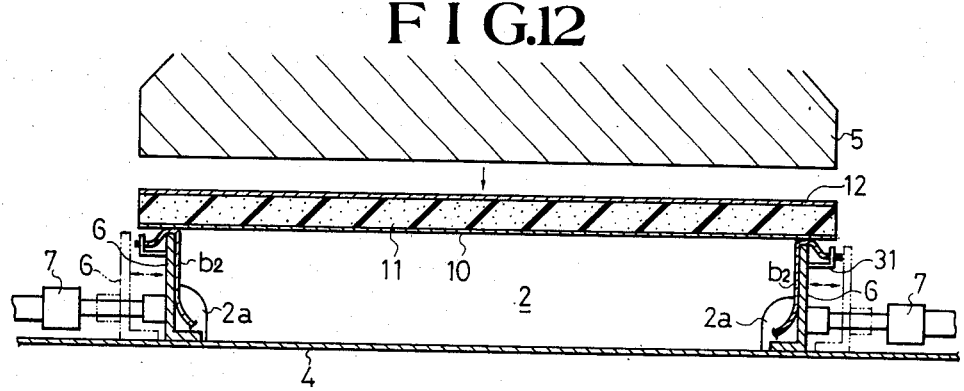
FIG. 12 is a sectional view of the second embodiment, illustrating a state in which the second embodiment is set in an apparatus for welding the side cover thereof to the main portion thereof perpendicularly to the recessed grooves formed in the main body.
Figure 13:
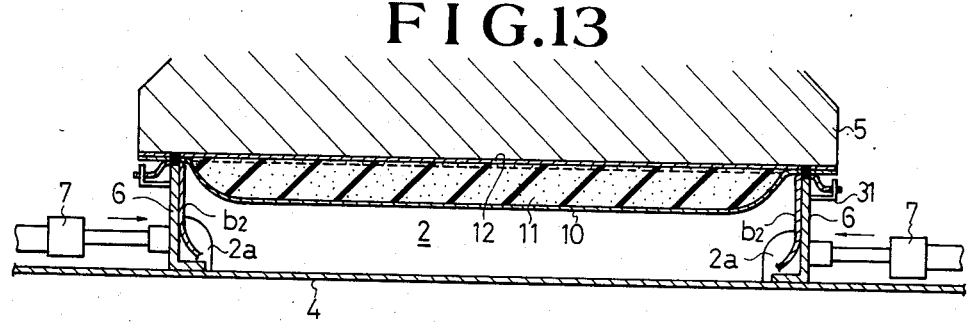
FIG. 13 is a sectional view of the second embodiment, illustrating a state in which the above-mentioned side cover has been welded.

In the apparatus shown in FIGS. 12 and 13, the joint electrodes (6)(6) are respectively mounted such that they can be slided by cylinders (7)(7), respectively.

Figure 14:
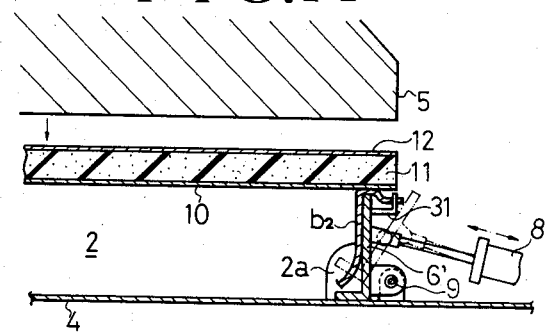
FIG. 14 is a partially cutaway sectional view of the second embodiment, illustrating a state in which the second embodiment is set in an apparatus which permits a joint forming electrode for welding the side cover to be rotated by means of a hinge.
Figure 15:
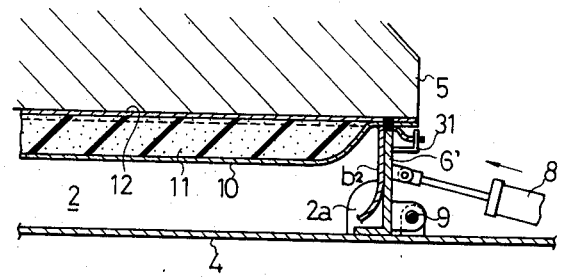
FIG. 15 is a partially cutaway sectional view of the second embodiment, illustrating a state in which the side cover has been welded by the welding apparatus shown in FIG. 14.
Figure 16:
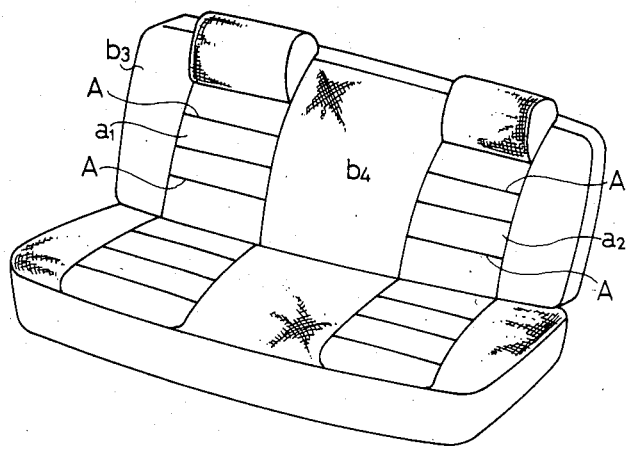
FIG. 16 is a perspective view of a bench seat incorporating therein a trim cover assembly of the invention, illustrating a state in which the trim cover assembly is used in the bench seat.
Figure 17:
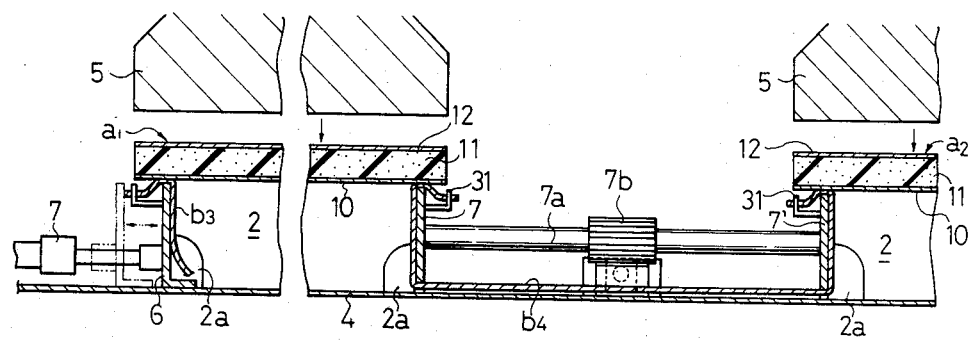
FIG. 17 is a sectional view of the above-mentioned trim cover assembly, illustrating a state in which the trim cover assembly is set in an apparatus for manufacturing the trim cover assembly.
Figure 18:
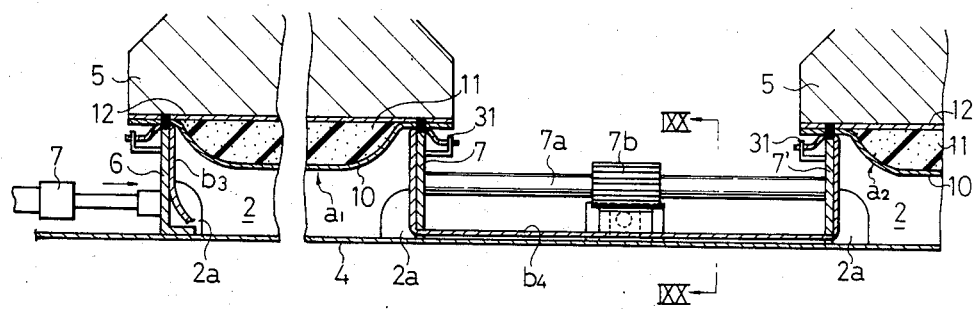
FIG. 18 is a sectional view of the above-mentioned trim cover assembly, illustrating a state in which the trim cover assembly has been welded by the above-mentioned manufacturing apparatus of the invention.

On the other hand, in the apparatus shown in FIGS. 14 and 15, the joint electrode (6') is mounted so as to be rotatable by means of a hinge (9) and a cylinder (8) adapted to be able to rise and fall.

In the lower portions of the recessed-groove forming electrode (2) toward which the above-mentioned joint electrodes (6)(6') approach, there are formed escape grooves (2a)(2a) into which the side covers (b2)(b2) can get.

In operation, after the ends of the side covers (b2)(b2) are mounted at positions shown by two-dot chained lines in FIGS. 12 and 14 in the same manner as in the above-mentioned embodiment, the electrodes (6)(6') are moved by the cylinders (7)(8) to approach toward the recessed-groove forming electrode (2), respectively. Then, if the upper electrode (5) is lowered down to press against the lamination of the three elements (10)(11)(12), then the high frequency waves are applied to the lamination. As a result of this, the recessed grooves (A)(A) are formed in the main body (a) and at the same time the side covers (b2)(b2) are integrally welded to the main body (a) to form a trim cover assembly.

Figure 19:
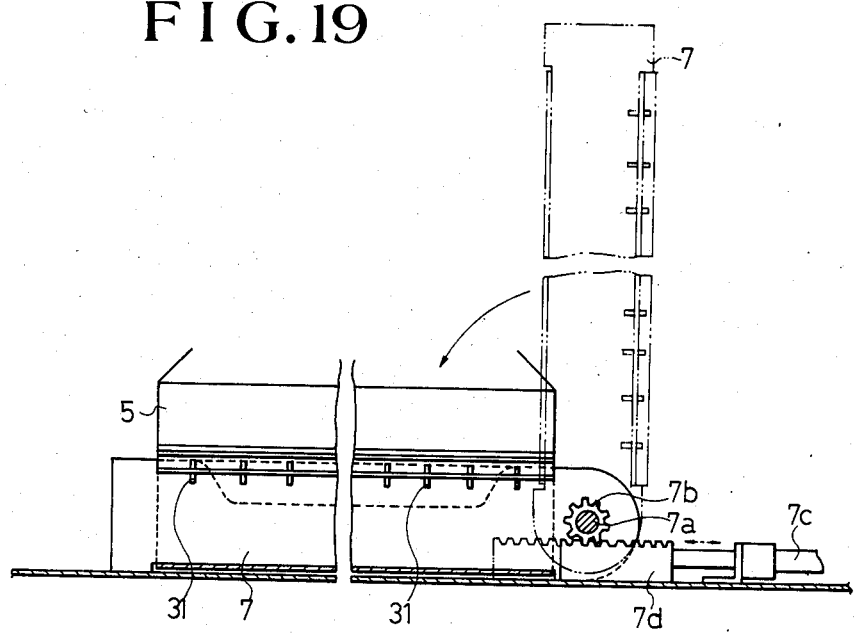
FIG. 19 is a sectional view taken along line IXX—IXX in 18.
Figure 20:
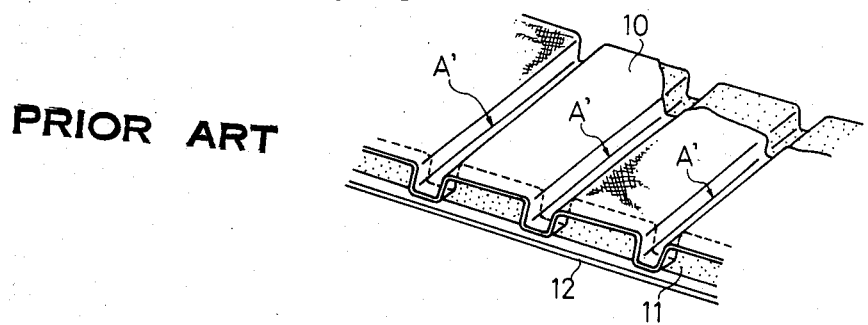
FIG. 20 is a perspective view of the main body of a conventional trim cover assembly, illustrating a state in which the ends of the main body are not yet treated; and, FIG. 21 is a perspective view of the main body of the conventional trim cover assembly, illustrating a state in which the ends of the main body have been treated.
Figure 21:
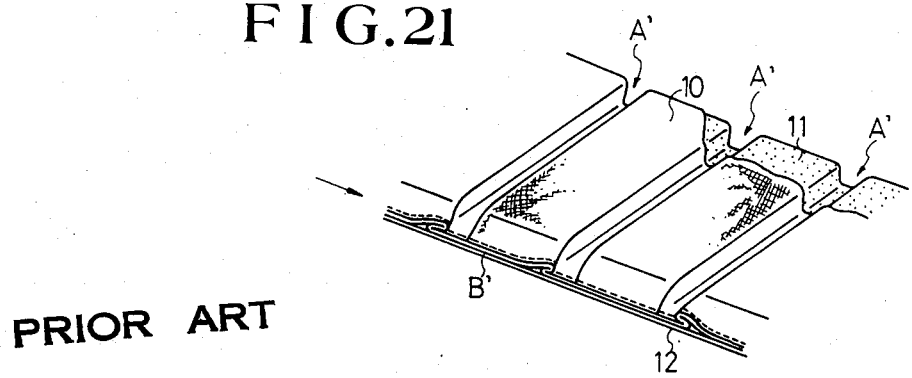

Referring now to FIGS. 16 to 19, there is illustrated an apparatus for manufacturing a trim cover assembly for use in a bench seat. In other words, this is a manufacturing apparatus which join the respective ends of a side cover (b3), a main body (a'), a side cover (b4) and a main body (a2) with one another and at the same time can form recessed grooves (A)(A) in the respective main bodies (a1)(a2), while the side cover (b4) provided between the two main bodies (a1) (a2) is disposed on lower electrodes (7)(7') shown in FIG. 19 during operation. That is, since these electrodes (7) (7') are fixed to the ends of a shaft (7a) and the shaft (7a) is intermeshed via a pinion (7b) with a rack (7d) provided in a cylinder (7c), the two lower electrodes (7) (7') can be rotated by means of forward and rearward movements of the cylinder (7c) in such a manner as shown in FIG. 19. Also, the two lower electrodes (7)(7') are interposed between the two electrodes (2)(2) for forming the recessed grooves in the two main bodies (a1)(a2) to weld the right and left ends of the side cover (b4) to the ends of the two main bodies (a1)(a2).

Accordingly, after the side cover (b4) is extended between the above-mentioned two lower electrodes (7)(7') and the two ends of the side cover (b4) are fixed at their respective tip ends to the projection pieces (31)(31) respectively, the lower electrodes (7)(7') are rotated by the cylinder (7c) from the positions shown by the two-dot chained lines to the positions shown by the solid lines in FIG. 19. Next, similarly as mentioned above, the side cover (b3) is mounted to the joint electrode (6) and is moved toward the recessed-groove forming electrode (2). Then, the lamination of the three elements (10)(11)(12) forming the above-mentioned main bodies (a1)(a2) is placed onto the recessed-groove forming electrodes (2)(2) and the upper electrodes (5)(5) are lowered down. Consequently, the recessed grooves (A) are formed in the main bodies (a1)(a2) and at the same time the respective ends of the side cover (b3), main body (a1), side cover (b4) and main body (a2) are welded to one another so as to form the trim cover assembly.

According to the invention, since one or more joint electrodes for joining the ends of main bodies and side covers are mounted removably and adjacently to one or more recessed-groove forming electrodes for forming recessed-grooves in the main bodies, the side covers can be joined and connected with the main bodies simultaneously when the recessed-grooves are formed in the main bodies. Therefore, a trim cover assembly having the joint portions on the back surface thereof and the recessed-grooves for decoration on the surface of the main bodies thereof can be manufactured simply, resulting in the improved productivity.

What is claimed is:

1. A trim cover assembly for use in a vehicle seat comprising:
   a three-layer lamination of a thermally weldable covering material; and
   a wadding cover;
   said thermally weldable covering material having a plurality of spaced-apart decorative recessed grooves provided on a side thereof, said thermally weldable covering material having peripheral edges and a plurality of joint portions defined along the peripheral edges at a side thereof which lays in a direction perpendicular to an extending direction of said plurality of said spaced-apart decorative recessed grooves, and said thermally weldable covering material further having a plurality of substantially S-shaped folded portions each being formed at respective parts of said joint portions corresponding to said spaced-apart decorative grooves and further being integrally welded with the wadding cover.

2. The trim cover assembly for use in a vehicle seat as set forth in claim 1, wherein other separate components of said trim cover assembly are simultaneously welded to said joint portions.

3. The trim cover assembly for use in a vehicle seat as set forth in claim 2, wherein components of said trim cover assembly to be provided with said plurality of decorative recessed grooves constitute a main body thereof and said other separate components of said trim cover assembly include a side cover thereof.

4. The trim cover assembly for use in a vehicle seat as set forth in claim 1, wherein a portion of said trim cover assembly corresponding to said plurality of decorative recessed grooves and said joint portions are simultaneously formed by high-frequency welding.

* * * * *